UNITED STATES PATENT OFFICE.

NICOLAUS GROH, OF HELENVILLE, WISCONSIN.

IMPROVED ROOFING COMPOSITION.

Specification forming part of Letters Patent No. 47,416, dated April 25, 1865.

*To all whom it may concern:*

Be it known that I, NICOLAUS GROH, of Helenville, in the county of Jefferson and State of Wisconsin, have invented a new and Improved Roofing Composition; and I do hereby declare that the following is a full, clear, and exact description thereof, which will enable others skilled in the art to fully understand and make use of the same.

This invention relates to a roofing compound which is perfectly impervious to water, and which is also fire-proof.

The compound is made of asphalt, sand, iron filings, wood-ashes, and hydraulic lime or cement, and these ingredients are mixed together in about the following proportion: asphalt, fifty parts; sand, fifty parts; iron filings, nine parts; wood-ashes, six parts; hydraulic cement, nine parts. The asphalt is melted over a slow fire, and the sand, iron filings, ashes, and cement are first passed through sieves of greater or less fineness, according to the nature of the compound desired, and they are then gradually stirred in the melted asphalt, either by hand or suitable mechanism, until the whole mass is evenly mixed. After this has been accomplished the compound is ready for use. It must be applied while hot and before it sets, and it can be put directly on the roofing-board; or stout paper or canvas may be placed between it and the boards.

My compound may also be used with advantage for sidewalks, cellar-floors, and other similar purposes; but in that case, instead of sand, small pebble-stones have to be used; or small pebbles must be mixed with the compound.

The ashes which I use by preference is that obtained by burning maple, though I do not wish to confine myself to one particular kind of ashes, but reserve the right to use ashes of any kind of wood which I may think proper.

My compound is cheap, it can be readily applied to roofs of any description, and one of its chief advantages over other similar compounds is that it is fire-proof.

I claim as new and desire to secure by Letters Patent—

A roofing compound made of the ingredients herein described, and mixed together about in the proportion and substantially in the manner herein set forth.

NICOLAUS GROH.

Witnesses:
 I. W. BIRD,
 GOTTLIEB MUCK.